Patented Sept. 11, 1951

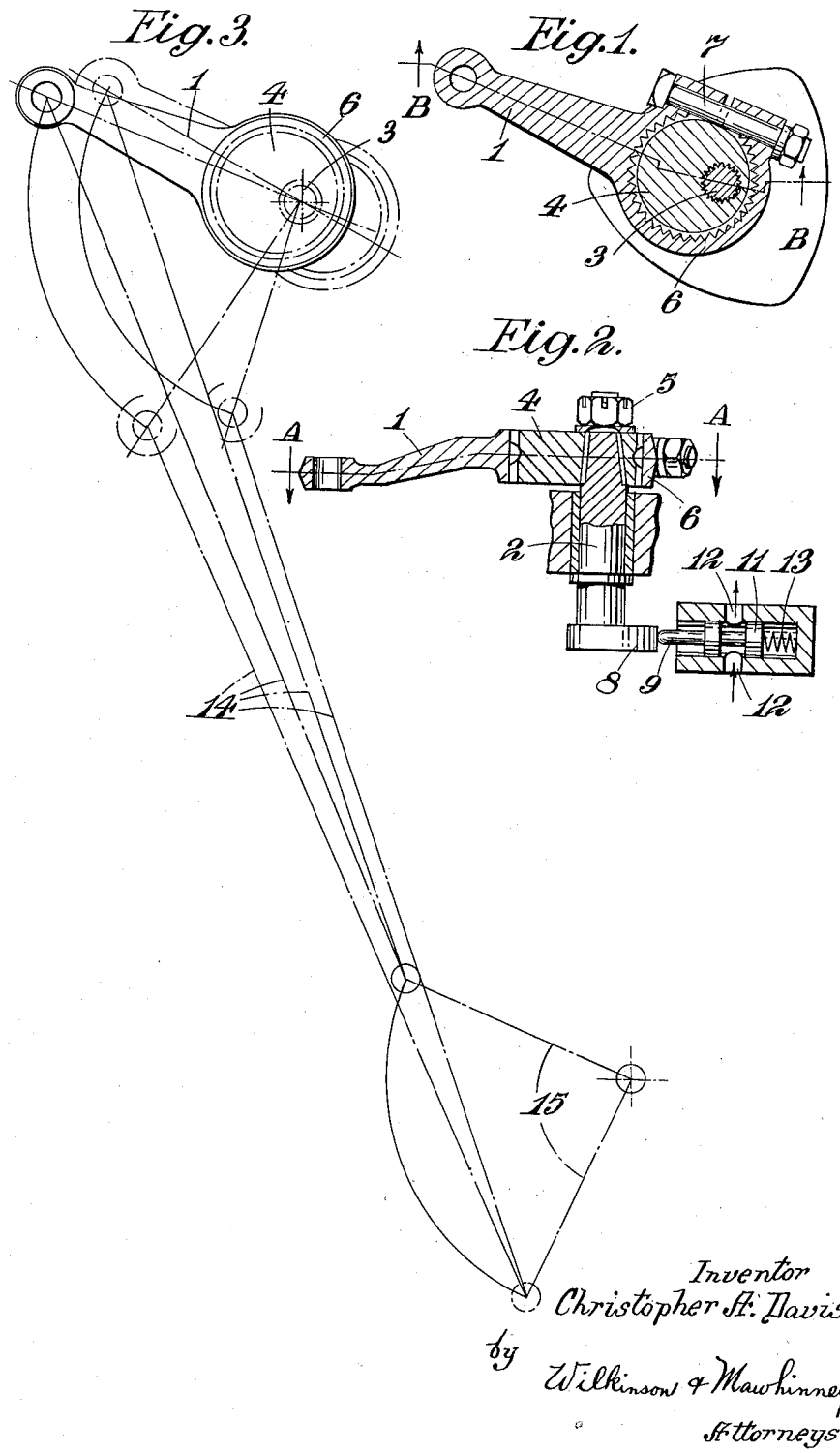

2,567,555

UNITED STATES PATENT OFFICE 2,567,555

OPERATING LEVER, PARTICULARLY FOR USE WITH THE THROTTLE VALVES FOR INTERNAL-COMBUSTION ENGINES

Christopher Ainsworth Davis, Barrow on Soar, England, assignor to Rolls-Royce Limited, Derby, England, a British company Application January 23, 1947, Serial No. 723,856 In Great Britain December 4, 1945

Section 1, Public Law 690, August 8, 1946
Patent expires December 4, 1965

7 Claims. (Cl. 74—559)

This invention comprises an arrangement for mounting an operating lever on a rotatable member.

The object of the invention is to provide an improved or simplified mounting arrangement which can be adjusted to vary the effective length of the lever and also to set the lever to a required angular position relative to the rotatable member. The invention is particularly applicable to lever mechanism for operating a throttle or regulating valve for internal combustion turbines on aircraft in which it may be required to adjust the mechanism so as to vary the angular movement transmitted to the operating lever for a given movement of a pilot's control lever and also to adjust the setting of the throttle or control valve for a given position of the operating lever.

According to the invention an operating lever is fixed to a serrated ring which engages correspondingly formed serrations on the periphery of an eccentric hub mounted on a rotatable member so as to be angularly adjustable about the axis of rotation thereof, the eccentric hub being adapted to be fixed in any one of a number of angular positions relatively to the serrated ring for the purpose of adjusting the effective length of the lever, whilst the adjustability of the eccentric hub relatively to the rotatable member enables the operating lever to be fixed in any required angular position relatively to the member.

In one form of the invention, the serrated ring is split and is fitted with a clamping screw by which it can be clamped tightly to the eccentric hub, thus ensuring a secure fastening of the lever to the hub.

In order to key the eccentric hub securely to the rotatable member, the eccentric hub may have a square or other non-circular eccentric bore, and the rotatable member may have a non-circular spindle part adapted to be inserted into the bore in any one of a number of different positions of rotation. For use on aircraft or in other conditions where absolute security against loosening by vibration is required, the eccentric hub may have a tapered eccentric bore adapted to receive a correspondingly tapered spindle part of the rotatable member, a nut being provided for clamping the eccentric hub on the tapered spindle part.

A preferred mounting arrangement according to the inventiton will now be described by way of example with reference to the accompanying drawing in which:

Figure 1 is a section on the line A—A of Figure 2, showing a lever mounted on a spindle in accordance with the invention, Figure 2 is a section on the lines B—B of Figure 1, and Figure 3 is a diagram showing one way in which the lever, mounted as described with reference to Figures 1 and 2, may be coupled to a control lever.

In the drawing the reference numeral 1 represents an operating lever and the reference numeral 2 indicates a spindle on which the lever 1 is mounted for the purpose of operating the same.

The spindle 2 has a tapered part 3 formed with external serrations adapted to engage corresponding internal serrations formed in an eccentric hub 4. A lock nut 5 is provided on the spindle for applying axial pressure to the eccentric hub 4 for the purpose of tightening it upon the tapered part 3 of the spindle.

The lever 1 is integral with a split ring 6 having internal serrations adapted to co-operate with corresponding serrations formed on the periphery of the hub 4 so that the lever can be fixed to the hub 4 in any one of a number of angular positions. The split ring 6 is provided with a bolt 7 for clamping it tightly in adjusted position on the hub 4.

The spindle 2 may either carry the butterfly valve of an internal combustion engine carburetter or, as in the embodiment shown in the drawing, may be arranged to control the fuel flow of an internal combustion turbine. For this purpose it is provided with a cam 8 engaging a plunger 9 fixed to a piston valve 11 which controls the flow of fuel through ports 12. A spring 13 holds the plunger 9 in engagement with the cam 8. The cam 8 can be designed to have a small lift so that it requires considerable rotational movement of the spindle 2 to cover the full range of fuel-piston valve adjustments.

As illustrated in Figure 3 of the drawings, the lever 1 may be connected by means of a pivoted link 14 to a cockpit lever 15. By adjusting the hub 4 relatively to the ring 6, the effective length of the lever 1 may be varied so as to vary the angular movement imparted to the spindle 2 for a given movement of the pilot's control lever 15. In Figure 3, the full line shows one position (and the heavy chain line another position) of lever 1 adjusted so as to give a relatively long lever arm (and thus to obtain a comparatively small angular movement of the lever 15) whilst the thin broken lines show two positions of the lever 1 adjusted to have a comparatively short effective length (and thus to give a comparatively large angular movement of the spindle 2 for a given movement of the lever 15). It will be evident that the spindle 2 can be set to any required angular position for a given position of the lever 1, by rotational adjustment of the hub 4 relatively to the spindle 2. The arrangement thus provides for adjustment of the setting of the spindle 2 to suit varying fuel-flow conditions in accordance with change of climate, and also to vary engine ratings.

The invention is not limited to levers for use on internal combustion turbines on aircraft, as it may be used in conjunction with other operating levers in which variations of movement of the part controlled is required for the same movements of a control lever.

As an alternative to serrations in the bore of the eccentric hub and on the spindle part of the rotatable member, these parts may be formed of square or other suitable polygonal section but in the latter case the setting positions which can be selected are much fewer in number.

I claim:

1. An operating lever mounting comprising a lever, a rotatable member to be operated by said lever, a hub, a plurality of serrations on said rotatable member and said hub for fixing said hub eccentrically on said rotatable member in any one of a number of positions of rotation about the axis of rotation of said member, serrations on the periphery of said hub and a serrated ring on said lever engaging said serrations on said hub.

2. An operating lever mounting comprising a lever, a rotatable member to be operated by said lever, a hub, a plurality of serrations on said rotatable member and said hub for fixing said hub eccentrically on said rotatable member in any one of a number of positions of rotation about the axis of said member, serrations on the periphery of said hub, a split ring on said lever having serrations for engaging the serrations on said hub and a clamping screw for clamping said split ring in tight engagement with said hub.

3. An operating lever mounting comprising a lever, a rotatable member to be operated by said lever, a hub having an eccentric bore formed with a plurality of internal serrations, a spindle part of said rotatable member having a plurality of external serrations for engaging with the internal serrations in the said hub in any one of a number of different positions of rotation, serrations on the periphery of said hub and a serrated ring on said lever engaging said serrations on said hub.

4. An operating lever mounting comprising a lever, a rotatable member to be operated by said lever, a hub having a tapered eccentric bore formed with a plurality of internal serrations, a correspondingly tapered spindle part of said rotatable member formed with a plurality of external serrations for engaging in said eccentric bore, a nut for clamping the hub on the tapered part of the spindle, serrations on the periphery of said hub and a serrated ring integral with said lever and engaging said serrations of said hub.

5. An operating lever mounting comprising a lever, a rotatable member to be operated by said lever, said rotatable member having a tapered spindle part, a plurality of serrations on said tapered spindle part, a hub having a tapered eccentric bore for engaging said tapered spindle part and having a plurality of internal serrations for co-operating with the serrations on said spindle part, axial clamping means for clamping said hub in adjusted position on said tapered spindle part, serrations on the periphery of said hub, a split ring integral with said lever for engagement round said hub, said split ring having internal serrations for co-operating with the serrations on the periphery of said hub, and a clamping screw for clamping said split ring tightly in adjusted position on said hub.

6. An operating lever mounting comprising a lever, a rotatable member to be operated by said lever, a hub, a plurality of serrations on said rotatable member and said hub for fixing said hub eccentrically on said rotatable member in any one of a number of angular positions about the axis of rotation of said member, serrations on the periphery of said eccentric hub, a split ring on said lever having internal serrations intermeshing with the peripheral serrations on said hub, said serrations extending approximately parallel with the axis of rotation of said member, and means for contracting said split ring tightly about the hub.

7. An operating lever mounting comprising a lever, a rotatable member to be operated by said lever having a tapered externally serrated portion, a hub having an eccentric opening with a plurality of internal serrations adapted to intermesh with the serrations on the tapered portion of said rotatable member in any of a plurality of angularly adjusted positions of the hub about the axis of rotation of said member, fastening means on the narrower end of the tapered portion of said rotatable member abutted directly against said hub for causing the serrations to mesh together to provide a driving fit of the hub on said rotatable member, a split ring on said lever in which said hub is rotatably adjustable, concurrently with the adjustment of the hub about the tapered portion of said rotatable member, to alter the effective length of said lever, the adjacent contacting surfaces of said hub and lever being substantially concentric and approximately cylindrical from side to side of said ring and the hub, said ring and hub having complementary serrations on their inner and outer concentric contacting portions, and means for contracting the split ring to cause the last mentioned serrations to mesh together to bind the hub to rotate with said ring and lever.

CHRISTOPHER AINSWORTH DAVIS.

REFERENCES CITED

The following references are of record in the file of this patent:

UNITED STATES PATENTS

| Number | Name | Date |
|---|---|---|
| 56,631 | Stiles | July 24, 1866 |
| 276,292 | Seymour | Apr. 24, 1883 |
| 656,608 | Moore | Aug. 21, 1900 |
| 1,088,247 | Thompson | Feb. 24, 1914 |
| 1,092,102 | Henry, Jr. | Mar. 31, 1914 |
| 1,767,282 | Goble | June 24, 1930 |
| 2,135,190 | Martin | Nov. 1, 1938 |
| 2,165,460 | Desing | July 11, 1939 |